(12) United States Patent
Lee et al.

(10) Patent No.: US 7,812,541 B2
(45) Date of Patent: Oct. 12, 2010

(54) LIQUID CRYSTAL DISPLAY DEVICE

(75) Inventors: Yun-gun Lee, Cheonan-si (KR);
Moon-shik Kang, Seongnam-si (KR);
Min-soo Choi, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 336 days.

(21) Appl. No.: 11/930,772

(22) Filed: Oct. 31, 2007

(65) Prior Publication Data
US 2008/0116819 A1    May 22, 2008

(30) Foreign Application Priority Data
Nov. 17, 2006   (KR)   ...................... 10-2006-0113595

(51) Int. Cl.
  *H01J 1/52*    (2006.01)
(52) U.S. Cl. ........................... 315/85; 362/97.2; 336/90
(58) Field of Classification Search ................... 315/57,
  315/70, 85; 362/602, 630–634, 97.1, 97.2;
  349/61; 345/102; 336/90
  See application file for complete search history.

(56) References Cited

U.S. PATENT DOCUMENTS 6,621,670 B2 *   9/2003   Hayakawa et al. ............ 361/42
2003/0007109 A1 *   1/2003   Park ............................ 349/58
2007/0165151 A1 *   7/2007   Lee et al. ...................... 349/56
2007/0279545 A1 *  12/2007   Jang ............................. 349/56

FOREIGN PATENT DOCUMENTS

| KR | 1019990023691 | 3/1999 |
| KR | 1020050075458 | 7/2005 |
| KR | 1020050120869 | 12/2005 |

* cited by examiner

*Primary Examiner*—Thuy Vinh Tran
(74) *Attorney, Agent, or Firm*—Cantor Colburn LLP

(57) ABSTRACT

A liquid crystal display device includes a liquid crystal display panel, a lamp disposed behind the liquid crystal display panel, a cover accommodating the lamp, and an inverter disposed behind the cover. The inverter includes a substrate and a transformer mounted on the substrate and driving the lamp. The transformer includes a core and a coil that is wound around at least a part of the core. The liquid crystal display panel further includes a transformer cover which covers the coil, an inverter cover which covers the inverter and the transformer cover, and a metal member in the transformer cover.

17 Claims, 9 Drawing Sheets

LIQUID CRYSTAL DISPLAY DEVICE

This application claims priority to Korean Patent Application No. 2006-0113595, filed on Nov. 17, 2006, and all benefits accruing therefrom under 35 U.S.C. §119, the disclosure of which in its entirety is herein incorporated by reference.

BACKGROUND OF THE INVENTION

1. Field of the Invention

The present invention relates generally to a liquid crystal display device. More particularly, the present invention relates to a liquid crystal device including a transformer having reduced magnetic noise.

2. Description of the Related Art

A flat display device, such as a liquid crystal display ("LCD"), a plasma display panel ("PDP") or an organic light emitting diode ("OLED") has been developed to replace a cathode ray tube ("CRT").

The LCD includes a liquid crystal display panel. The liquid crystal display panel includes a first substrate having a thin film transistor, a second substrate facing the first substrate, and a liquid crystal layer interposed between the first and second substrates. As the LCD panel does not emit light itself, it receives light from a backlight unit which is disposed behind a thin film transistor substrate. Light transmissivity of the backlight unit is adjusted according to an arrangement of liquid crystals.

The backlight unit is classified as an edge type and a direct type according to the position of a light source.

If the LCD panel employs the direct type backlight unit, a plurality of light sources is arranged across the LCD panel. The direct type backlight unit provides high brightness and is thus widely used in a large-screen liquid crystal display device.

A lamp is commonly used as the light source of the direct type backlight unit, which requires power of high voltages to be driven. To supply power with high voltages, an inverter which includes a transformer is provided in the LCD device.

The transformer generates a lot of magnetic noise, which can adversely impact a surrounding signal line or an antenna, which in turn, can ultimately lower picture quality.

BRIEF SUMMARY OF THE INVENTION

Accordingly, it is an aspect of the present invention to provide a liquid crystal display device which includes a transformer having reduced magnetic noise.

The foregoing and/or other aspects of the present invention can be achieved by providing a liquid crystal display device including a liquid crystal display panel, a lamp disposed behind the liquid crystal display panel, a cover accommodating the lamp, and an inverter disposed behind the cover. The inverter includes a substrate and a transformer mounted on the substrate and driving the lamp, the transformer includes a core and a coil that winds around at least a part of the core. The liquid crystal display panel further includes a transformer cover which covers the coil, an inverter cover which covers the inverter and the transformer cover, and a metal member which is disposed on the transformer cover.

According to an aspect of the present invention, at least a part of the metal member is disposed between the coil and the inverter cover.

According to an aspect of the present invention, the metal member includes a metal plate.

According to an aspect of the present invention, the metal plate includes nickel.

According to an aspect of the present invention, a planar surface of the metal member is arranged in parallel with a planar surface of the substrate.

According to an aspect of the present invention, the inverter cover includes plastic.

According to an aspect of the present invention, the transformer cover includes plastic.

According to an aspect of the present invention, the metal member faces the inverter cover.

According to an aspect of the present invention, the transformer cover includes a stepped seating part in which the metal member is seated.

According to an aspect of the present invention, the transformer cover includes a first cover portion which is provided between the coil and the inverter cover and is disposed in a first direction. The transformer cover also includes a pair of second cover portions extending in a second direction that is substantially perpendicular to the first direction, the second cover portions extending from respective edge portions of the first cover portion and toward the substrate. The transformer cover also includes a pair of third cover portions which extends outwardly from an end part of the pair of the second cover portions, the pair of third cover portions disposed in parallel with the first cover portion and the substrate.

According to an aspect of the present invention, the core is provided as a pair and respectively includes: a first core portion which is wound with the coil and disposed between the pair of second cover portions; a pair of second core portions which is disposed on the third cover portions outside the second cover portions, the first core portion disposed therebetween; and a third core portion which connects the first core portion and the second core portion.

According to an aspect of the present invention, the transformer further includes a bobbin which surrounds the first core portion and is wound with the coil.

According to an aspect of the present invention, the bobbin includes plastic.

According to an aspect of the present invention, a planar surface of the first cover portion is in parallel with a planar surface of the substrate, and the metal member includes a nickel plate and is disposed in the first cover portion.

According to an aspect of the present invention, the metal member is disposed under the inverter cover, and the first cover portion includes a stepped seating part in which the metal member is seated.

The foregoing and/or other aspects of the present invention can be achieved by providing a liquid crystal display device, including a liquid crystal display panel, a lamp which is disposed behind the liquid crystal display panel, and an inverter which is disposed behind the lamp. The inverter includes a substrate and a transformer mounted on the substrate where the inverter drives the lamp. The liquid crystal display device also includes an inverter cover formed from plastic and covering the inverter. The liquid crystal display device further includes a metal plate which faces the substrate, the transformer disposed therebetween.

According to an aspect of the present invention, the metal plate is disposed in the inverter cover.

According to an aspect of the present invention, the liquid crystal display device further includes a transformer cover formed from plastic. The transformer cover may be disposed between the substrate and the inverter cover and covering at least a part of the transformer. The metal plate may be disposed in the transformer cover.

According to an aspect of the present invention, the transformer includes a core and a coil which winds around at least a part of the core. The transformer cover may cover the coil.

According to an aspect of the present invention, the metal plate includes nickel.

According to an aspect of the present invention, a planar surface of the metal plate is arranged in parallel with a planar surface of the substrate.

According to an aspect of the present invention, the metal plate is disposed in the transformer cover and faces the inverter cover.

According to an aspect of the present invention, the transformer cover includes a stepped seating part in which the metal member is seated.

BRIEF DESCRIPTION OF THE DRAWINGS

The above and/or other aspects, features, and advantages of the present invention will become apparent and more readily appreciated from the following description of the exemplary embodiments, taken in conjunction with the accompanying drawings, in which.

DETAILED DESCRIPTION OF THE INVENTION

Figure 1:
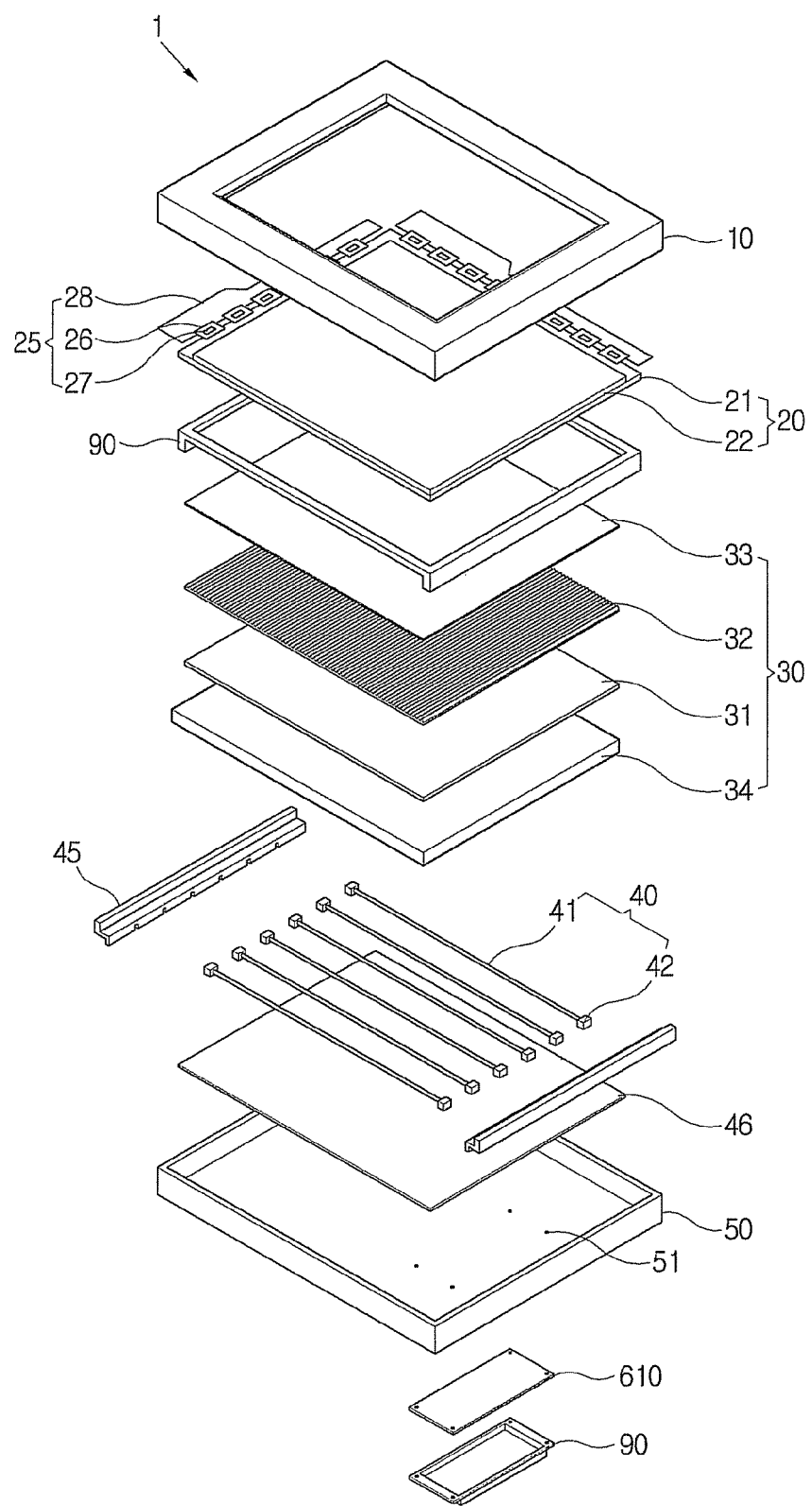
FIG. 1 is an exploded perspective view of a first exemplary embodiment of a liquid crystal display device according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the exemplary embodiments of present invention will be described in detail with reference to the accompanying drawings.

A liquid crystal display device according to a first exemplary embodiment of the present invention will be described with reference to FIGS. 1 through 4.

As shown therein, a liquid crystal display device 1 includes a liquid crystal display panel 20, an optical member 30 which is disposed behind the liquid crystal display panel 20, a lamp 40 which is disposed behind the optical member 30, and a reflection plate 46 which is provided behind the lamp 40. The liquid crystal display panel 20 is mounted in a panel supporting mold 90 and an end part of the lamp 40 is accommodated in a side mold 45. The foregoing elements are accommodated between an upper cover 10 and a lower cover 50.

The liquid crystal display panel 20 includes a first substrate 21 on which a thin film transistor is formed, and a second substrate 22, which is disposed above the first substrate 21 and faces the first substrate 21. A liquid crystal layer (not shown) is disposed between the first substrate 21 and the second substrate 22. While forming an image by adjusting an arrangement of the liquid crystal layer, the liquid crystal display panel 20 does not emit light itself and thus should receive light from the lamp 40 that is disposed there behind.

A driver 25 is disposed along a lateral portion of the first substrate 21 to supply a driving signal. The driver 25 includes a flexible printed circuit board ("FPC") 26 having a first edge connected to the first substrate, a driving chip 27 which is embedded in the FPC 26, and a printed circuit board ("PCB") 28 which is connected with a second edge of the FPC 26. The driver 25 according to the present invention may employ a chip on film ("COF") method, but not limited thereto. Alternatively, the driver 25 may employ other known methods including a tape carrier package ("TCP") method and a chip on glass ("COG") method. Otherwise, the driver 25 may be embedded in the first substrate 21.

The optical member 30, which is disposed behind the liquid crystal display panel 20, includes a diffusion film 31, a prism film 32, a protection film 33, and a diffusion plate 34.

The diffusion film 31 diffuses light that is incident by the diffusion plate 34, and prevents the occurrence of a bright line caused by the lamp 40.

The prism film 32 may include triangular prisms that are arranged at predetermined intervals on a top side thereof. The prism film 32 collects light that is diffused by the diffusion film 31, to be distributed in a direction that is substantially perpendicular to a planar surface of the liquid crystal display panel 20. In an exemplary embodiment, two sheets of prism films 32 may be provided. A micro prism formed in the respective prism films 32 forms a predetermined angle. The light from the prism film 32 travels vertically to provide uniform brightness distribution.

The protection film 33 is disposed as a top layer of the optical member 30 to protect the prism film 32 from being scratched.

The diffusion plate 34 that is disposed under the diffusion film 31 may include polymethylmethacrylate ("PMMA") or poly carbonate ("PC"). The diffusion plate 34 may have a diffusion member that is scattered therein. Alternatively, the diffusion plate 34 may be coated with a diffusion member layer. The diffusion plate 34 may be thick and relatively dense in order to provide a distance between the optical member 30 and the reflection plate 46.

The optical member 30 may further include a lamp supporter (not shown) to provide a distance between the diffusion plate 34 and the reflection plate 46.

A plurality of lamps 40 may be provided and disposed in parallel with each other. Each of the lamps 40 includes a lamp main body 41 and electrode supporters 42 which are provided at opposite ends of the lamp main body 41 and connected thereto. A lamp electrode (not shown) is disposed in the electrode supporters 42.

The lamps 40 may include a cold cathode fluorescent lamp ("CCFL") or an external electrode fluorescent lamp ("EEFL"). The opposite ends of the lamps 40, i.e., the electrode supporters 42, are accommodated in the side mold 45. The side mold 45 may be formed of a plastic material, which surfaces may be coated with a reflection layer to improve reflection properties.

In another exemplary embodiment, the lamps 40 may be connected with a socket that is disposed in the side mold 45 to receive power therefrom.

The reflection plate 46 is disposed under the lamps 40 and reflects downward-directed light toward the diffusion plate 34. The reflection plate 46 may include a plastic material such as polyethyleneterephtalate ("PET") or poly carbonate ("PC").

An inverter 60 (refer to FIG. 2) is provided behind the lower cover 50 to drive the lamps 40. The inverter 60 is covered with an inverter cover 90. The inverter cover 90 may be formed from a plastic material to reduce manufacturing costs thereof, as well as overall weight.

The lamps 40 are connected with the inverter 60 through a cable (not shown) to receive power.

Hereinafter, the inverter 60, a transformer cover 70 and a metal member 80 will be described with reference to FIGS. 2 to 4.

Figure 2:
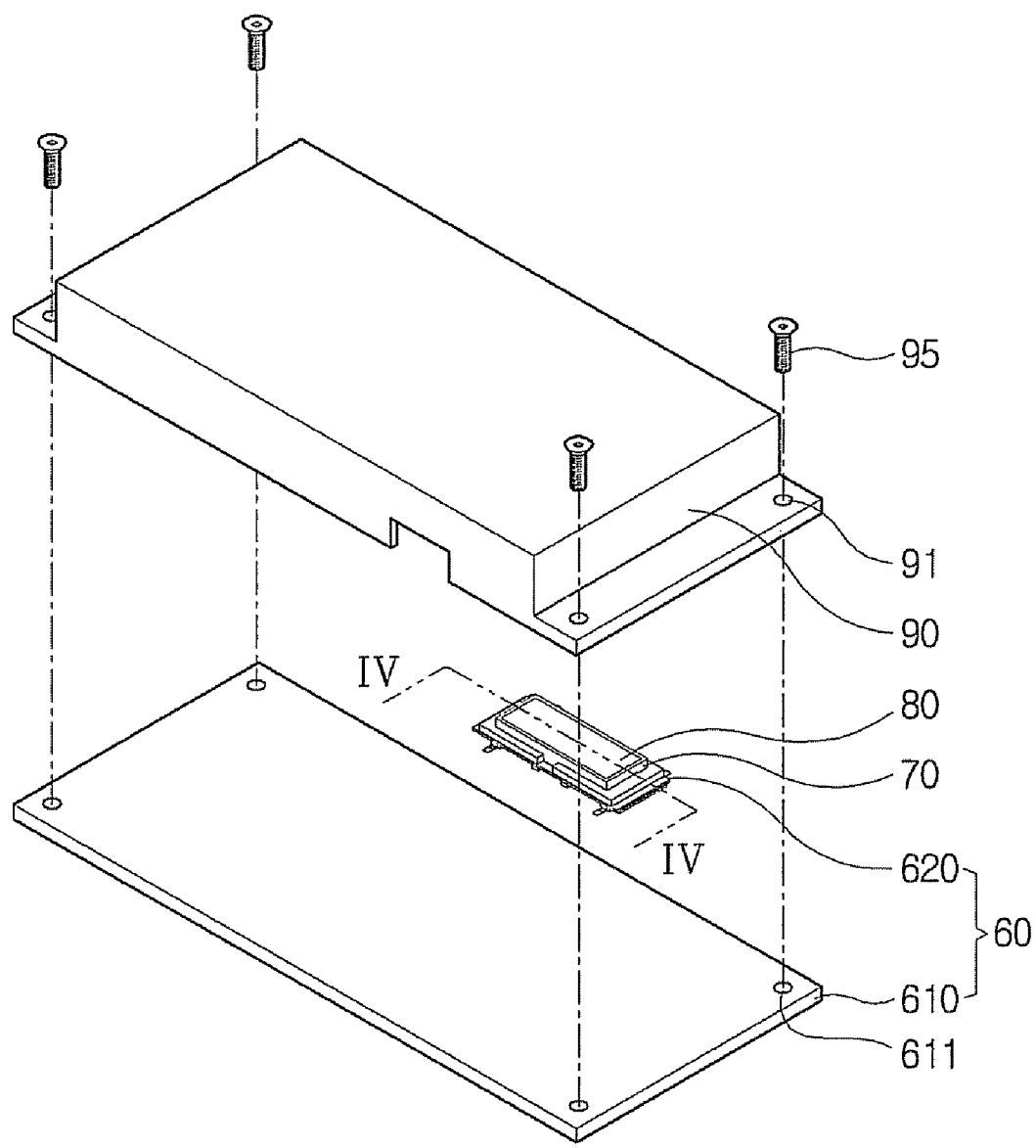
FIGS. 2 and 3 are exploded upside-down perspective views of portions of the liquid crystal display device according to the first exemplary embodiment of the present invention.

As shown in FIG. 2, the inverter 60 includes a substrate 610 and a transformer 620 that is disposed on the substrate 610. The substrate 610 includes an integrated circuit (not shown) to control the inverter 60. A part of the transformer 620 is covered with the transformer cover 70. Both the inverter 60 and the transformer cover 70 are covered with the inverter cover 90.

While the inverter 60 may be driven with tens of volts, the lamps 40 are driven with approximately a thousand volts. The transformer 620 transforms direct current ("DC") power supplied from the substrate 610 into a boosted alternating current ("AC") power and supplies it to the lamps 40. The transformer 620 includes an input pin (not shown) and an output pin (not shown) which are connected with a coil 640. The input pin and the output pin may be soldered to the substrate 610.

Figure 3:
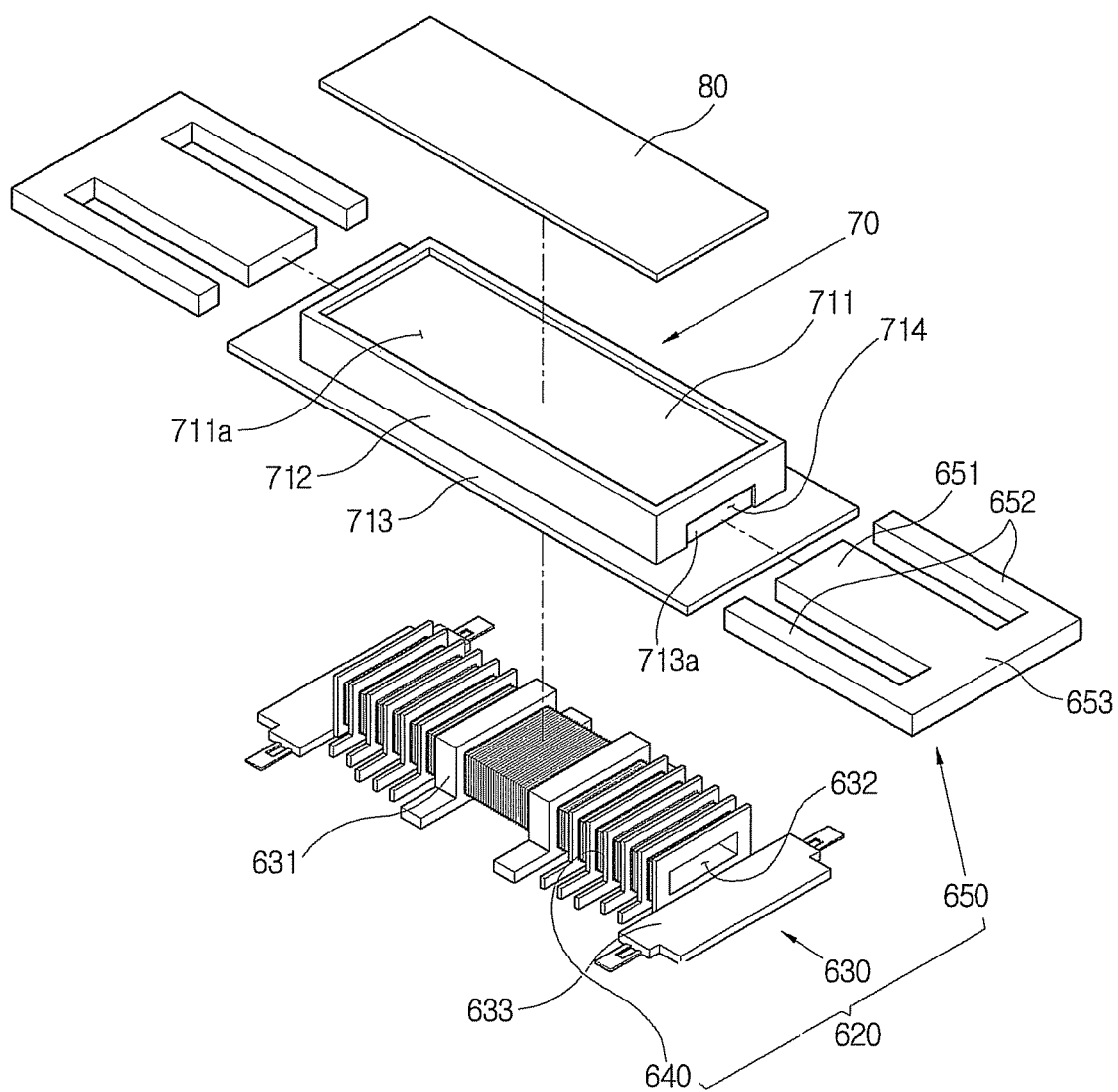
Figure 4:
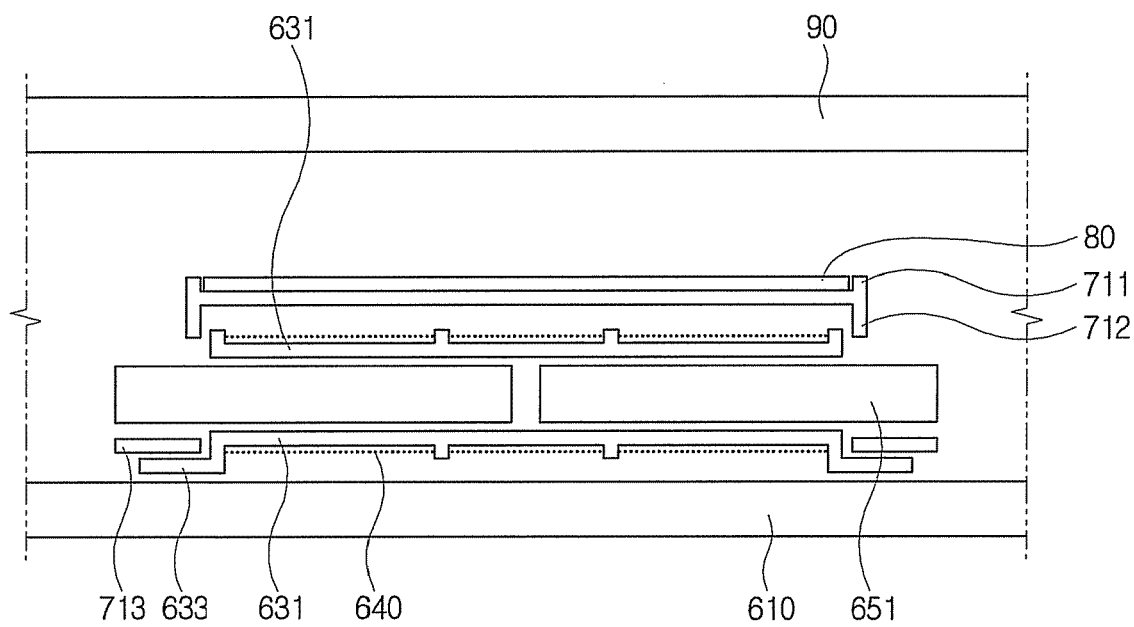
FIG. 4 is a cross-sectional view of a portion of the liquid crystal display device, taken along line IV-IV in FIG. 2.

As shown in FIGS. 3 and 4, the transformer 620 includes a bobbin 630, the coil 640 and a core 650.

The bobbin 630 may be formed from a plastic material. The bobbin 630 includes a main body 631 which is wound with the coil 640 thereon, and an extension part 633 which is connected with the substrate 610.

The main body 631 is elongated and may have a substantially rectangular shape. The main body 631 includes a core accommodator 632 which is provided therein to accommodate a part of the core 650. A part of the main body 631 protrudes outwardly from the main body 631.

The core 650 may be formed of a metal, such as iron, and in an exemplary embodiment, the core 650 has an E-shape. The core 650 guides magnetic flux and includes a first core portion 651, a pair of second core portions 652 and a third core portion 653.

The first core portion 651 is accommodated in the core accommodator 632 of the bobbin 630, and thus wrapped with the coil 640. The second core portions 652 are disposed outside of the transformer cover 70. The third core portion 653 connects the first core portion 651 and the second core portions 652. The core 650 is provided as a pair. The pair of cores 650 is disposed with respect to the transformer cover 70, such that end parts of the first core portion 651 face each other.

The transformer cover 70 may be formed from a plastic material and protects the transformer 620 from external impurities.

The transformer cover 70 includes a first cover portion 711, a second cover portion 712 and a third cover portion 713.

The first cover portion 711 may have a rectangular shape and a planar surface thereof is disposed in parallel with a planar surface of the substrate 610 (e.g., in a horizontal direction). The first cover portion 711 directed to the inverter cover 90 includes a stepped seating part 711a which forms a recess thereon to seat the metal member 80 thereon. The second cover portion 712 extends substantially perpendicularly from an edge portion of the first cover portion 711 (e.g., in a vertical direction) toward the substrate 610. The coil 640 is accommodated in a transformer accommodator 714 that is formed by the first and second cover portions 711 and 712, respectively. The third cover portion 713 is formed in parallel with the first cover portion 711, and includes an opening 713a having, e.g., a substantially rectangular shape so that the main body 631 is accommodated in the transformer accommodator 714 during assembly thereof. The second core portions 652 are disposed on the third cover portion 713.

The metal member 80 may have a rectangular shape and is seated in the seating part 711a of the first cover portion 711. The metal member 80 may have a plate shape and may be formed from, e.g., nickel, iron, copper, or an alloy thereof. The metal member 80 may be adhered to the seating part 711a by an adhesive.

In another exemplary embodiment, the metal member 80 may be additionally formed in the second cover 712.

Hereinafter, a process of connecting the transformer 620, the transformer cover 70 and the metal member 80 will be described.

The main body 631 of the bobbin 630 is wound with the coil 640 and then the bobbin 630 is connected with the substrate 610 through the extension part 633. The main body 631 of the bobbin 630 that is wound with the coil 640 is accommodated in the transformer accommodator 714 of the transformer cover 70. The main body 631 passes through the opening 713a of the third cover portion 713. The main body 631 of the bobbin 630 may be partially accommodated in the transformer accommodator 714.

The first core portion 651 of the core 650 is inserted into the core accommodator 632. The second core portions 652 are disposed on the third cover portion 713.

The metal member 80 is adhered to the transformer cover 70 before the foregoing connecting process.

A screw 95 connects the inverter cover 90, the substrate 610 and the lower cover 50 while passing through coupling holes 91, 611 and 51 that are respectively formed in the inverter cover 90, the substrate 610 and the lower cover 50.

Figure 5:
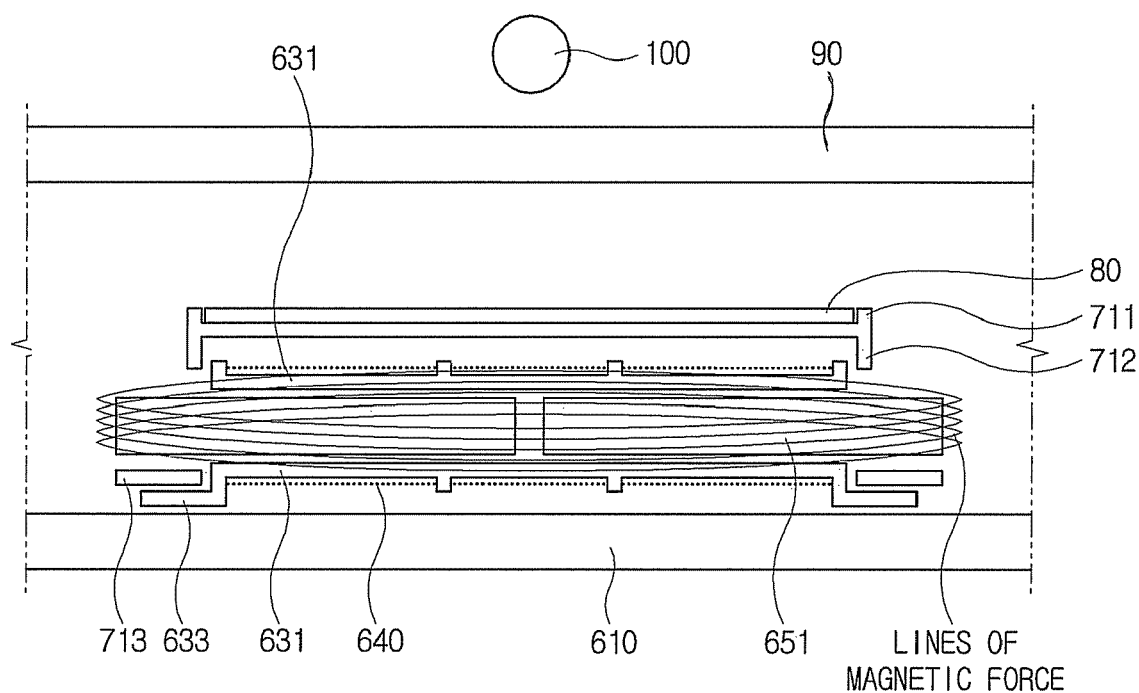
FIG. 5 illustrates lines of magnetic force in a transformer of the liquid crystal display device according to the first exemplary embodiment of the present invention.

The transformer 620 according to the first exemplary embodiment of the present invention generates less magnetic noise, which will now be described with reference to FIGS. 1 and 5.

The metal member 80 is disposed above the coil 640 which generates a significant amount of magnetic noise. The metal member 80 has a tendency to absorb lines of magnetic force, thereby reducing the lines of magnetic force formed above the metal member 80.

If the liquid crystal display device 1 is employed in a monitor or TV sets, a signal line 100 may be disposed above the inverter cover 90. In this case, the transformer 620 may affect the signal line 100, particularly by a magnetic field of the inverter 60.

According to the first exemplary embodiment of the present invention, the metal member 80 is disposed between the signal line 100 and the coil 640 so that the lines of magnetic force generated by the transformer 620 have little or no affect on the signal line 100. Even if the inverter cover 90 includes a plastic material, the magnetic field can be efficiently absorbed.

Figure 6:
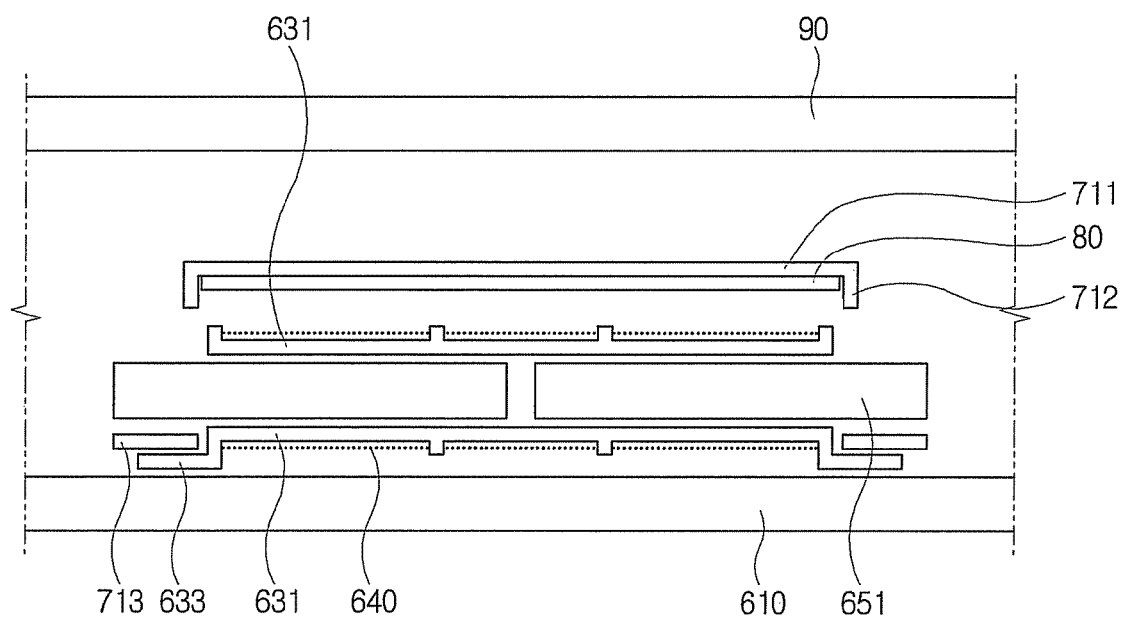
FIGS. 6 and 7 are upside-down cross-sectional views of second and third exemplary embodiments of a portion of a liquid crystal display device according to the present invention.

A liquid crystal display device according to a second exemplary embodiment of the present invention will be described with reference to FIG. 6.

A metal member 80 has a plate shape and is disposed on an internal surface of the first cover portion 711 facing a coil 640. Unlike in the first exemplary embodiment of the present invention, the metal member 80 may include a film type that is coated on the first cover portion 711.

Figure 7:
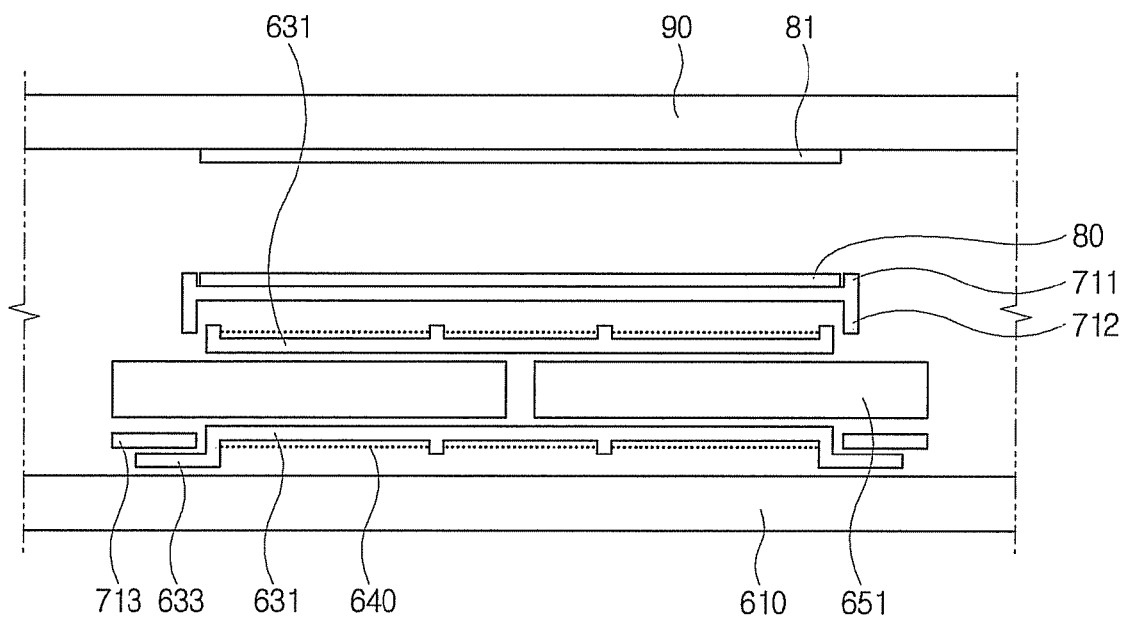

A liquid crystal display device according to a third exemplary embodiment of the present invention will be described with reference to FIG. 7.

A second metal member 81 is disposed on an internal surface of an inverter cover 90 facing the first metal member 80. Metal members 80 and 81, respectively, as disposed in a transformer cover 70 and the inverter cover 90, absorb lines of magnetic force more efficiently.

Figure 8:
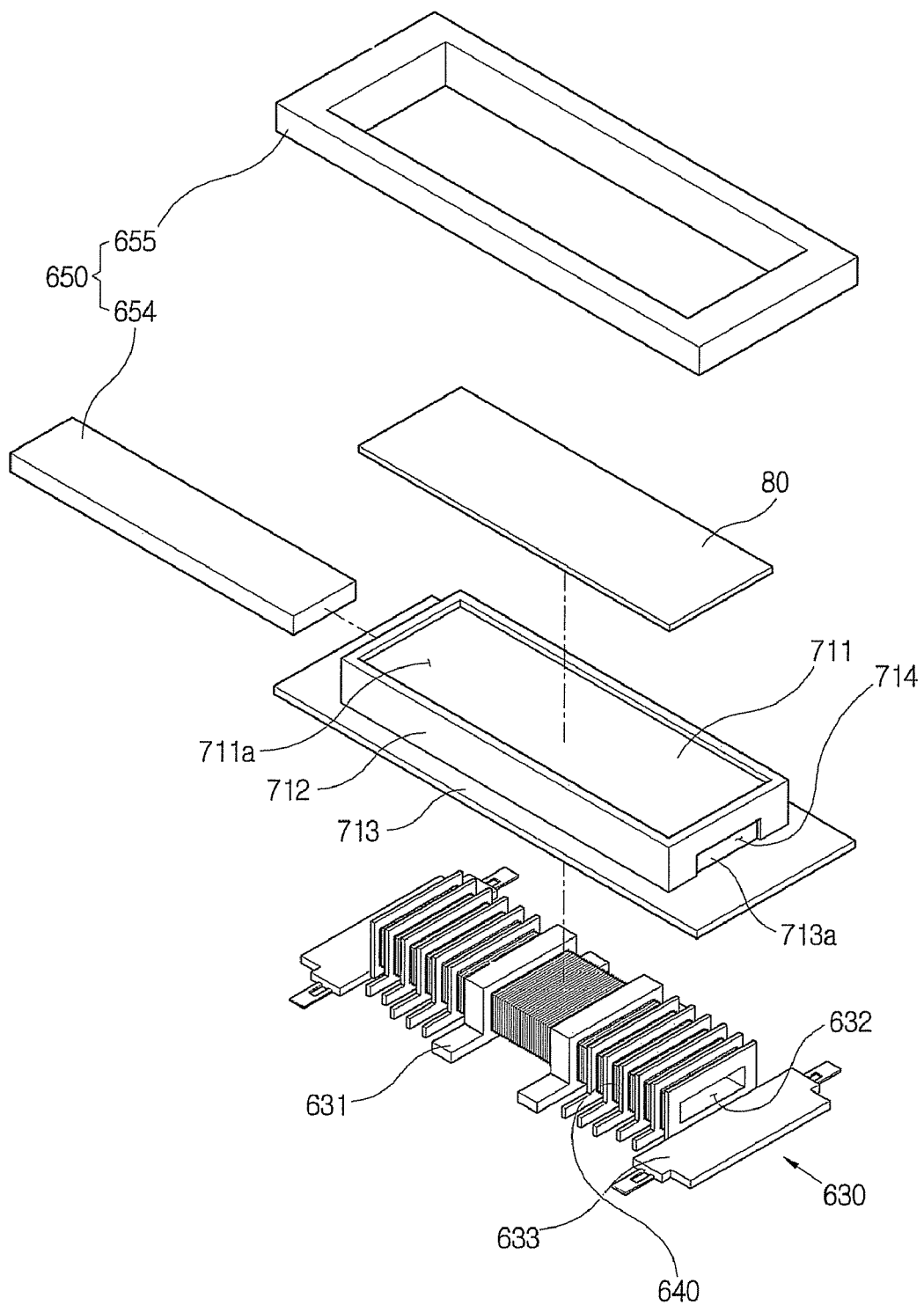
FIG. 8 is an upside down exploded perspective view of a fourth exemplary embodiment of portions of a liquid crystal display device according to the present invention.
Figure 9:
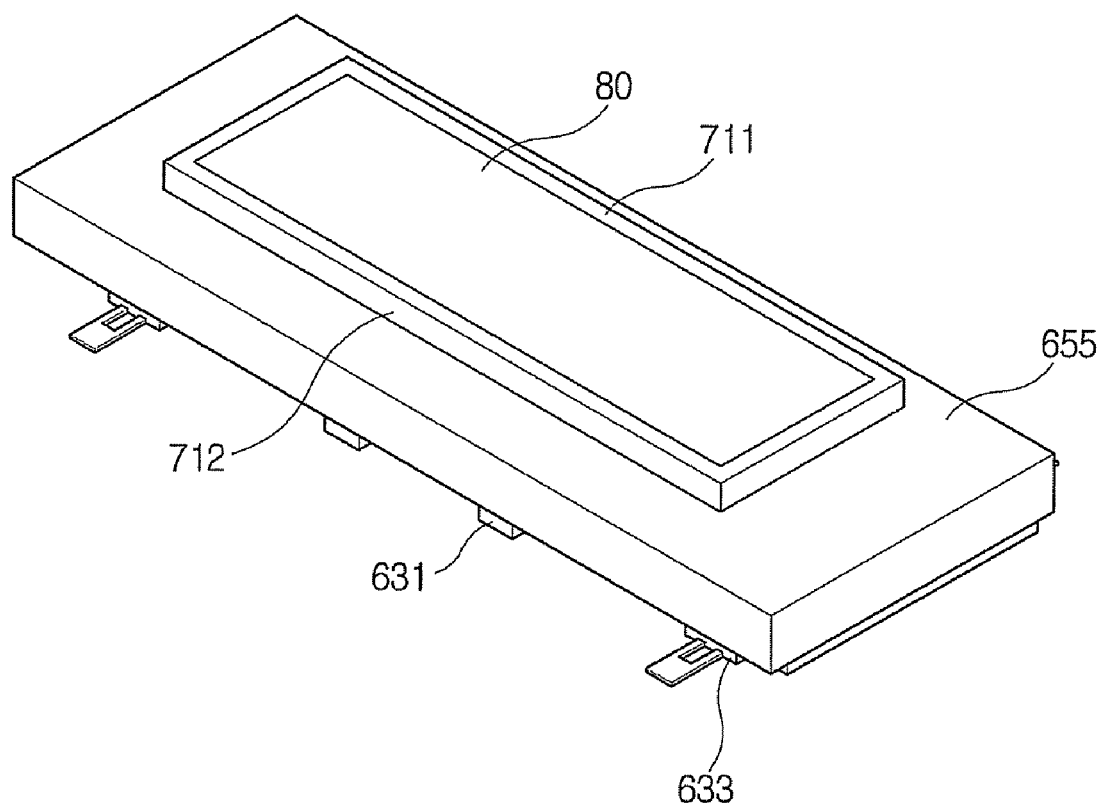
FIG. 9 is an upside down perspective view of portions of the liquid crystal display device according to the fourth exemplary embodiment of the present invention.

A liquid crystal display device according to a fourth exemplary embodiment of the present invention will be described with reference to FIGS. 8 and 9.

A core 650 includes a bar core 654 and a rectangular core 655. The bar core 654 is shaped like a bar, and is disposed in a core accommodator 632 during assembly. The rectangular core 655 has a substantially frame shape and extends outside of a transformer cover 70 to surround the bar core 654.

According to the fourth exemplary embodiment of the present invention, a metal member 80 is disposed on the bar core 654 and prevents lines of magnetic force from being formed toward an inverter cover 90.

In another exemplary embodiment of the present invention, a light guiding plate (not shown) is provided behind a liquid crystal display panel 20 while a lamp 40 may be disposed in a lateral part of the light guiding plate.

As described above, the present invention provides a liquid crystal display device which includes a transformer having reduced magnetic noise.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. An inverter assembly which drives a lamp, the inverter assembly comprising:
    a substrate;
    a transformer mounted on the substrate, the transformer comprising a core and a coil, the coil wound around at least a part of the core;
    a transformer cover which covers the coil;
    an inverter cover which covers an inverter and the transformer cover, and
    a metal member which is disposed in the transformer cover, wherein the transformer is disposed behind the lamp and the inverter cover disposed behind the transformer,
    wherein at least a part of the metal member is disposed between the coil and the inverter cover to block a magnetic field of the coil in a direction opposite to the substrate.

2. The inverter assembly according to claim 1, wherein the metal member comprises a metal plate.

3. The inverter assembly according to claim 2, wherein the metal plate comprises nickel.

4. The inverter assembly according to claim 3, wherein the metal member is arranged in parallel with the substrate.

5. The inverter assembly according to claim 4, wherein the inverter cover comprises plastic.

6. A backlight unit comprising:
a lamp;
a cover accommodating the lamp;
an inverter disposed behind the cover, the inverter including a substrate and a transformer mounted on the substrate and driving the lamp, the transformer comprising a core and a coil, the coil wound around at least a part of the core;
a transformer cover which covers the coil;
an inverter cover which covers the inverter and the transformer cover; and
a metal member which is disposed in the transformer cover,
wherein the transformer is disposed behind the lamp and the inverter cover disposed behind the transformer,
wherein at least a part of the metal member is disposed between the coil and the inverter cover to block a magnetic field of the coil in a direction opposite to the substrate.

7. The backlight unit according to claim 6, wherein the metal member comprises a metal plate.

8. The backlight unit according to claim 7, wherein the metal plate comprises nickel.

9. The backlight unit according to claim 8, wherein the metal member is arranged in parallel with the substrate.

10. The backlight unit according to claim 9, wherein the inverter cover comprises plastic.

11. A liquid crystal display device comprising:
a liquid crystal display panel;
a lamp disposed behind the liquid crystal display panel;
a cover accommodating the lamp;
an inverter disposed behind the cover, the inverter including a substrate and a transformer mounted on the substrate and driving the lamp, the transformer comprising a core and a coil, the coil wound around at least a part of the core;
a transformer cover which covers the coil;
an inverter cover which covers the inverter and the transformer cover; and
a metal member which is disposed in the transformer cover,
wherein the transformer is disposed behind the lamp and the inverter cover disposed behind the transformer,
wherein at least a part of the metal member is disposed between the coil and the inverter cover to block a magnetic field of the coil in a direction opposite to the substrate.

12. The liquid crystal display device according to claim 11, wherein the metal member comprises a metal plate.

13. The liquid crystal display device according to claim 12, wherein the metal plate comprises nickel.

14. The liquid crystal display device according to claim 11, wherein the transformer cover comprises:
a first cover portion which is provided between the coil and the inverter cover, the first cover portion disposed in a first direction;
a pair of second cover portions extending in a second direction that is substantially perpendicular to the first direction, the second cover portions extending from respective edge portions of the first cover portion and toward the substrate; and
a pair of third cover portions which extends outwardly from an end part of the pair of the second cover portions, the pair of third cover portions disposed in parallel with the first cover portion and the substrate.

15. The liquid crystal display device according to claim 14, wherein the core is provided as a pair and respectively comprises:
a first core portion which is wound with the coil and disposed between the pair of second cover portions;
a pair of second core portions which is disposed on the third cover portions outside of the second cover portions, the first core portion disposed therebetween; and
a third core portion which connects the first core portion and the second core portion.

16. The liquid crystal display device according to claim 15, wherein the transformer further comprises a bobbin which surrounds the first core portion and is wound with the coil.

17. The liquid crystal display device according to claim 16, wherein the bobbin comprises plastic.

* * * * *